United States Patent
Chung et al.

(10) Patent No.: US 12,022,544 B2
(45) Date of Patent: Jun. 25, 2024

(54) SIGNAL MEASUREMENT METHOD FOR ADDING SECONDARY NODE IN DUAL CONNECTIVITY ENVIRONMENT AND ELECTRONIC DEVICE OF SAME

(71) Applicant: Samsung Electronics Co., Ltd., Gyeonggi-do (KR)

(72) Inventors: Wonsuk Chung, Gyeonggi-do (KR); Jihwan Kim, Gyeonggi-do (KR); Taeseop Lee, Gyeonggi-do (KR); Jiyoung Cha, Gyeonggi-do (KR); Hyejeong Kim, Gyeonggi-do (KR); Sangho Lee, Gyeonggi-do (KR); Suyoung Park, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 438 days.

(21) Appl. No.: 17/294,787

(22) PCT Filed: Nov. 19, 2019

(86) PCT No.: PCT/KR2019/015811
§ 371 (c)(1),
(2) Date: May 18, 2021

(87) PCT Pub. No.: WO2020/106001
PCT Pub. Date: May 28, 2020

(65) Prior Publication Data
US 2022/0015171 A1    Jan. 13, 2022

(30) Foreign Application Priority Data

Nov. 19, 2018  (KR) .................. 10-2018-0142620

(51) Int. Cl.
*H04W 76/15*    (2018.01)
*H04W 24/10*    (2009.01)
(Continued)

(52) U.S. Cl.
CPC .......... *H04W 76/15* (2018.02); *H04W 24/10* (2013.01); *H04W 48/08* (2013.01); *H04W 88/06* (2013.01)

(58) Field of Classification Search
CPC ..... H04W 76/15; H04W 24/10; H04W 88/06; H04W 48/08; H04W 28/0864
See application file for complete search history.

(56) References Cited

U.S. PATENT DOCUMENTS 11,082,874 B2    8/2021   Kim et al.
2015/0085646 A1  3/2015   Vannithamby et al.
(Continued)

FOREIGN PATENT DOCUMENTS

KR    10-2016-0141002 A    12/2016
KR       10-1805340 A1    12/2017
KR    10-2018-0108150 A    10/2018

OTHER PUBLICATIONS

Jha et al, "Efficient Algorithm to Reduce Power Consumption for EUTRA-New Radio Dual Connectivity RAN Parameter Measurements in 5G" IEEE 2020 (Year: 2020).*
(Continued)

*Primary Examiner* — Omer S Mian
(74) *Attorney, Agent, or Firm* — Cha & Reiter, LLC

(57) ABSTRACT

Various embodiments of the present invention relate to a signal measurement method for adding a secondary node in an electronic device and the electronic device thereof, and the electronic device may include a first communication circuit configured to provide first wireless communication using a first frequency range, a second communication circuit configured to provide second wireless communication using a second frequency range, a processor operatively connected with the first communication circuit and the second communication circuit, and a memory operatively connected with the processor, and configured to store at least (Continued)

one first measurement configuration information, and the memory may store instructions for, when executed, causing the processor to, using the first communication circuit, perform communication connection with a master node (MN) base station operating as an MN, while performing the communication connection with the MN base station, measure a state of a signal from at least one base station for operating as a secondary node (SN) using the at least one first measurement configuration information, using the second communication circuit, and transmit a first message including at least part of the measurement result, to the MN base station.

12 Claims, 13 Drawing Sheets

(51) Int. Cl.
*H04W 48/08* (2009.01)
*H04W 88/06* (2009.01)

(56) References Cited

U.S. PATENT DOCUMENTS

| | | |
|---|---|---|
| 2016/0234710 A1 | 8/2016 | Jung et al. |
| 2017/0374672 A1 | 12/2017 | Selvaganapathy et al. |
| 2017/0374705 A1 | 12/2017 | Mitsui et al. |
| 2018/0139646 A1 | 5/2018 | Basu Mallick et al. |
| 2018/0242209 A1 | 8/2018 | Xu et al. |
| 2018/0270682 A1* | 9/2018 | Zacharias ............ H04W 24/10 |
| 2018/0352600 A1* | 12/2018 | Wu ....................... H04W 24/10 |
| 2019/0253908 A1* | 8/2019 | Fan ....................... H04W 24/10 |

OTHER PUBLICATIONS

3GPP TSG RAN WG3 NR-adhoc; R3-170062; Jan. 19, 2017; "Further Consideration on Secondary Node Addition"; 5 pgs.
3GPP TSG RAN Meeting #81 RP-181724; Sep. 10-13, 2018; WI Summary of New Radio Access Technology; 19 pgs.
Korean Office Action dated Feb. 27, 2024.

* cited by examiner

SIGNAL MEASUREMENT METHOD FOR ADDING SECONDARY NODE IN DUAL CONNECTIVITY ENVIRONMENT AND ELECTRONIC DEVICE OF SAME

CROSS REFERENCE TO RELATED APPLICATIONS

This application is a National Phase Entry of PCT International Application No. PCT/KR2019/015811, which was filed on Nov. 19, 2019, and claims a priority to Korean Patent Application No. 10-2018-0142620, which was filed on Nov. 19, 2018, the contents of which are incorporated herein by reference.

TECHNICAL FIELD

Various embodiments of the present invention relate to a measurement method and an electronic device for adding a secondary node in a dual connectivity environment.

BACKGROUND ART

As use of an electronic device always carried by a person such as a smartphone, a notebook, and a tablet rapidly increases, demand for wireless data transmission is also increasing exponentially. To meet such user's demand, a long term evolution (LTE) system standardized a dual connectivity (DC) structure.

The dual connectivity structure in the LTE system may allow the electronic device to access a master node (MN) and a secondary node (SN) at the same time and to perform data transmission using a plurality of carriers, thus increasing a user's transmission rate and providing mobility robustness.

In addition, fifth generation (5G) new radio (NR) which is being standardized as a next-generation communication system after the LTE system standardizes not only the dual connectivity structure between NR systems and but also the dual connectivity structure using the LTE system and the NR system.

DISCLOSURE OF INVENTION

Technical Problem

If an electronic device (or a terminal) of a radio resource control (RRC) idle state is to initiate a fifth generation (5G) service, a considerable delay time may occur to add a base station belonging to a secondary node (SN). For example, the considerable time may be taken till the SN addition in that, after completing an access to a master node (MN), the electronic device receives SN measurement configuration information for the SN addition, and then performs SN base station search and measurement report.

Various embodiments of the present invention provide an efficient search and measurement method and an electronic device for adding a base station belonging to an SN without an unnecessary operation while minimizing a delay time occurring in measurement.

Solution to Problem

According to various embodiments of the present invention, an electronic device may include a first communication circuit configured to provide first wireless communication using a first frequency range, a second communication circuit configured to provide second wireless communication using a second frequency range, a processor operatively connected with the first communication circuit and the second communication circuit, and a memory operatively connected with the processor, and configured to store at least one first measurement configuration information, and the memory may store instructions for, when executed, causing the processor to, using the first communication circuit, perform communication connection with a master node (MN) base station operating as an MN, while performing the communication connection with the MN base station, measure a state of a signal from at least one base station for operating as a secondary node (SN) using the at least one first measurement configuration information, using the second communication circuit, and transmit a first message including at least part of the measurement result, to the MN base station.

According to various embodiments of the present invention, an operating method of an electronic device may include using a first communication circuit, performing communication connection with an MN base station operating as an MN, together with performing the communication connection with the MN base station, measuring a state of a signal received from at least one base station for operating as an SN using the at least one first measurement configuration information, using a second communication circuit, and transmitting a first message including at least part of the measurement result, to the MN base station.

Advantageous Effects of Invention

A method and an electronic device according to various embodiments may reduce a delay time taken to add a base station operating as a secondary node, in supporting dual connectivity.

A method and an electronic device according to various embodiments may reduce power consumed by the electronic device, by reducing a delay time taken to for add a base station operating as a secondary node in a dual connectivity environment.

BEST MODE FOR CARRYING OUT THE INVENTION

Hereinafter, various embodiments are described in detail with reference to the accompanying drawings.

Figure 1:
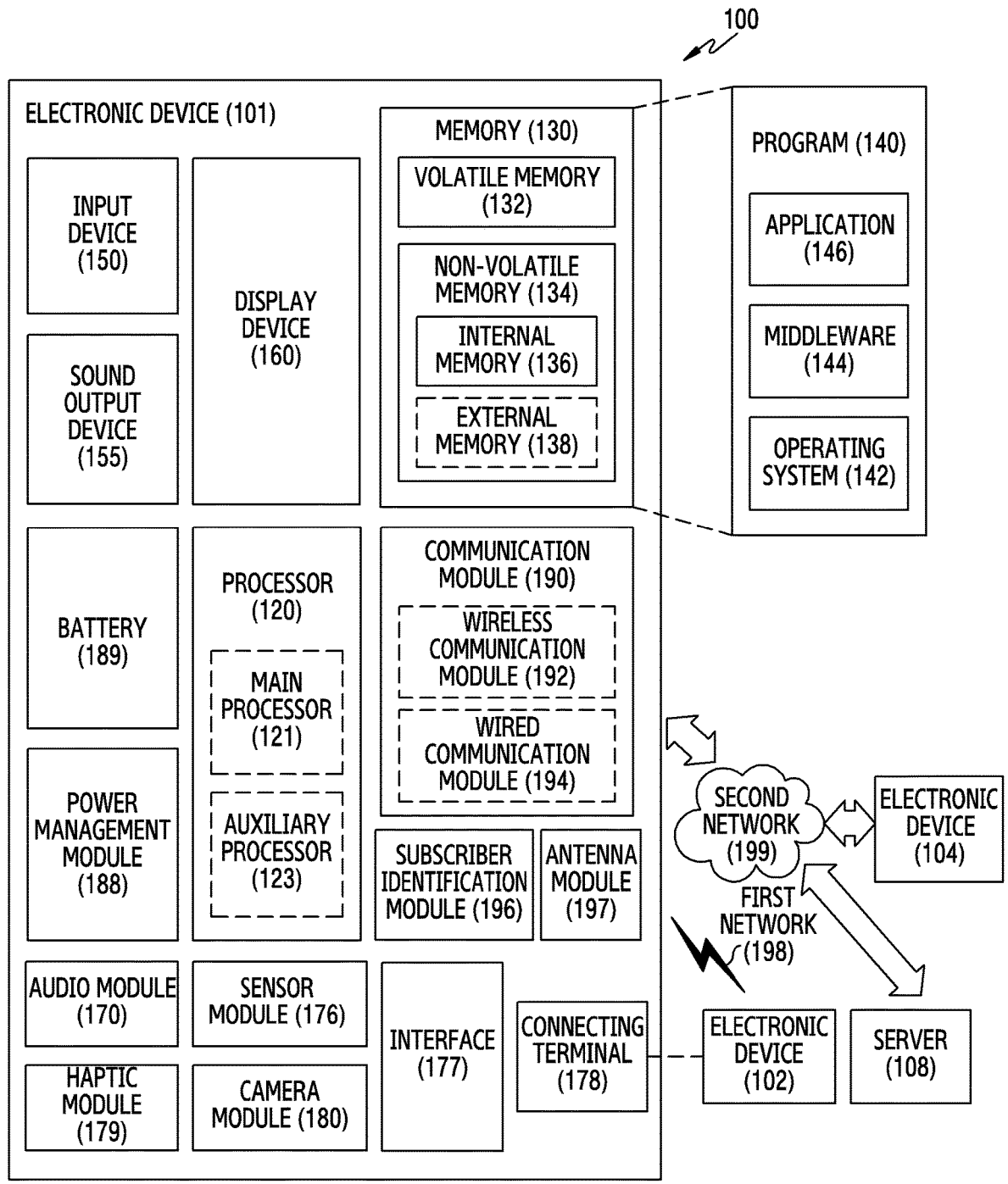
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
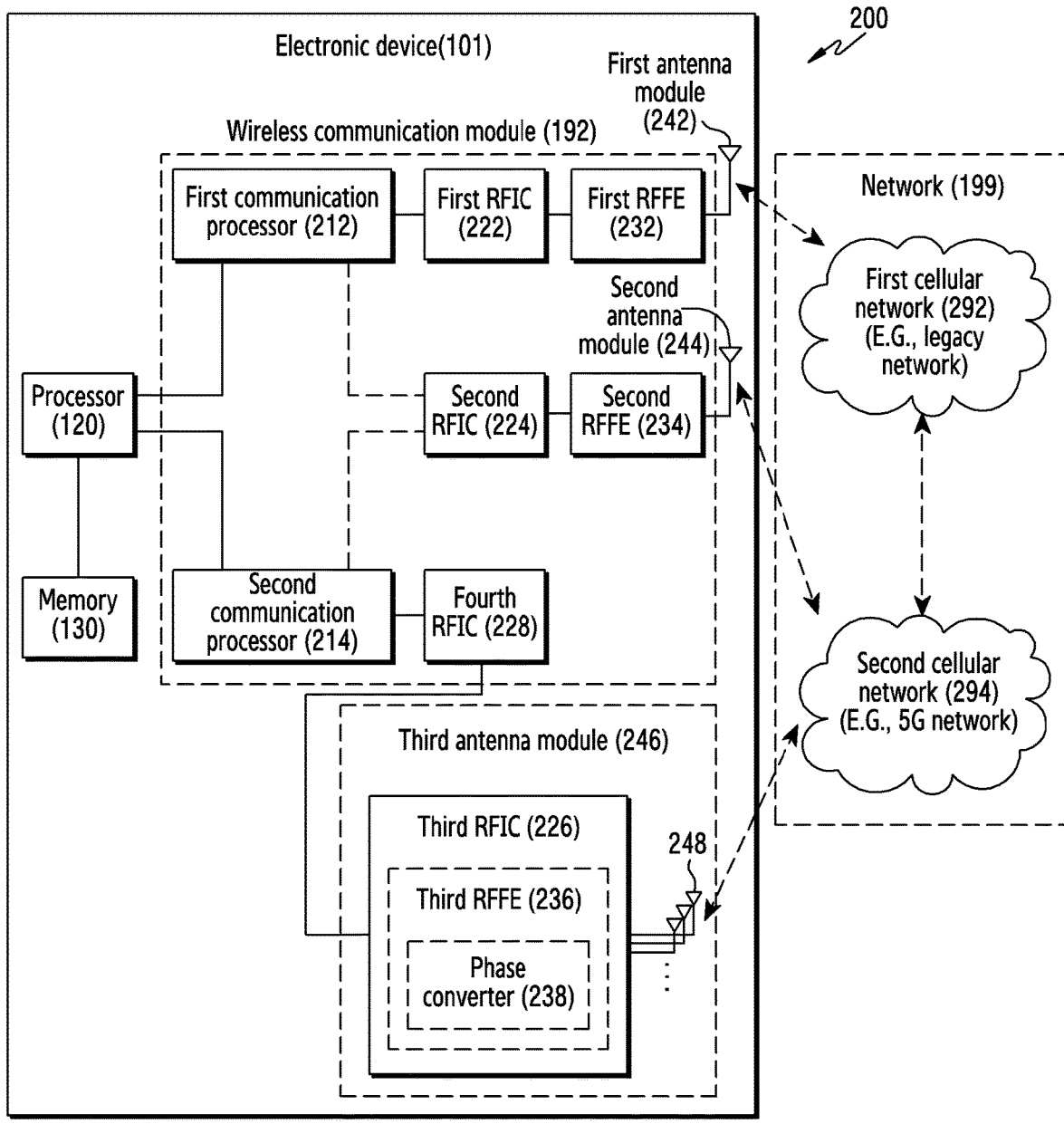
FIG. 2 is a block diagram of an electronic device for supporting legacy network communication and fifth generation (5G) network communication, according to various embodiments.

FIG. 2 is a block diagram 200 of an electronic device 101 for supporting legacy network communication and a fifth generation (5G) network communication, according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network (e.g., the second network 199 of FIG. 1) may include a first network 292 (e.g., a legacy network) and a second network 294 (e.g., a 5G network). According to another embodiment, the electronic device 101 may further include at least one component among the components shown in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted, or included as part of the third RFIC 226.

The first communication processor 212 may establish a communication channel of a band to be used for wireless communication with the first network 292, and support legacy network communication over the established communication channel. According to various embodiments, the first network may be the legacy network including a second generation (2G), 3G, 4G, or long term evolution (LTE) network. The second communication processor 214 may establish a communication channel corresponding to a designated band (e.g., about 6 GHz~about 60 GHz) of a band to be used for wireless communication with the second network 294, and support 5G network communication over the established communication channel. According to various embodiments, the second network 294 may be a 5G network defined by $3^{rd}$ generation partnership project (3GPP). Additionally, according to an embodiment, the first communication processor 212 or the second communication processor 214 may establish a communication channel corresponding to another designated band (e.g., about 6 GHz or less) of the band to be used for the wireless communication with the second network 294, and support 5G network communication over the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

The first RFIC 222 may convert, in transmission, a baseband signal generated by the first communication processor 212 to a radio frequency (RF) signal of about 700 MHz through about 3 GHz used by the first network 292 (e.g., the legacy network). In reception, an RF signal may be obtained from the first network 292 (e.g., the legacy network) via an antenna (e.g., the first antenna module 242), and preprocessed through an RFFE (e.g., the first RFFE 232). The first RFIC 222 may convert the preprocessed RF signal to a baseband signal to be processed by the first communication processor 212.

The second RFIC 224 may, in transmission, convert the baseband signal generated by the first communication processor 212 or the second communication processor 214 to an RF signal (hereinafter, a 5G Sub6 RF signal) of a Sub6 band (e.g., about 6 GHz or less) used for the second network 294 (e.g., the 5G network). In reception, a 5G Sub6 RF signal may be obtained from the second network 294 (e.g., the 5G network) via an antenna (e.g., the second antenna module 244), and preprocessed through an RFFE (e.g., the second RFFE 234). The second RFIC 224 may convert the preprocessed 5G Sub6 RF signal to a baseband signal to be processed by a corresponding communication processor of the first communication processor 212 or the second communication processor 214.

The third RFIC 226 may convert the baseband signal generated by the second communication processor 214 to an RF signal (hereinafter, a 5G Above6 RF signal) of a 5G Above6 band (e.g., about 6 GHz~about 60 GHz) to be used in the second network 294 (e.g., the 5G network). In reception, a 5G Above6 RF signal may be obtained from the second network 294 (e.g., the 5G network) via an antenna (e.g., the antenna 248) and preprocessed through the third RFFE 236. The third RFIC 226 may convert the preprocessed 5G Above6 RF signal to a baseband signal to be processed by the second communication processor 214. According to an embodiment, the third RFFE 236 may be formed as part of the third RFIC 226.

The electronic device 101 may include the fourth RFIC 228 separately from or as at least part of the third RFIC 226, according to an embodiment. In this case, the fourth RFIC 228 may convert the baseband signal generated by the second communication processor 214 to an RF signal (hereinafter, an intermediate frequency (IF) signal) of an IF band (e.g., about 9 GHz~about 11 GHz), and then forward the IF signal to the third RFIC 226. The third RFIC 226 may convert the IF signal to a 5G Above6 RF signal. In reception, a 5G Above6 RF signal may be received from the second network 294 (e.g., the 5G network) via an antenna (e.g., the antenna 248) and converted to an IF signal by the third RFIC 226. The fourth RFIC 228 may convert the IF signal to a baseband signal to be processed by the second communication processor 214.

According to an embodiment, the first RFIC 222 and the second RFIC 224 may be implemented as at least part of a single chip or a single package. According to an embodiment, the first RFFE 232 and the second RFFE 234 may be implemented as at least part of a single chip or a single package. According to an embodiment, at least one antenna module of the first antenna module 242 or the second antenna module 244 may be omitted or combined with other antenna module to process RF signals of a plurality of corresponding bands.

According to an embodiment, the third RFIC 226 and the antenna 248 may be disposed on the same substrate and form the third antenna module 246. For example, the wireless communication module 192 or the processor 120 may be disposed on a first substrate (e.g., a main PCB). In this case, the third RFIC 226 may be disposed in some area (e.g., a lower surface) of the second substrate (e.g., a sub PCB) separated from the first substrate, and the antenna 248 may be disposed in some other area (e.g., an upper surface), thus forming the third antenna module 246. By disposing the third RFIC 226 and the antenna 248 on the same substrate, it is possible to reduce a length of a transmission line therebetween. This may reduce, for example, loss (e.g., attenuation) of a signal of a high frequency band (e.g., about 6 GHz~about 60 GHz) used in the 5G network communication by the transmission line. Thus, the electronic device 101 may improve communication quality or speed with the second network 294 (e.g., the 5G network).

According to an embodiment, the antenna 248 may be formed with an antenna array including a plurality of antenna elements which may be used for beamforming. In this case, the third RFIC 226 may include, for example, a plurality of phase shifters 238 corresponding to the plurality of the antenna elements, as part of the third RFFE 236. In transmission, the plurality of the phase converters 238 each may convert a phase of the 5G Above6 RF signal to be transmitted to outside (e.g., a base station of the 5G network) of the electronic device 101 through a corresponding antenna element. In reception, the plurality of the phase converters 238 each may convert a phase of the 5G Above6 RF signal received from the outside through a corresponding antenna element to the same or substantially same phase. This enables transmission or reception through the beamforming between the electronic device 101 and the outside.

The second network 294 (e.g., the 5G network) may be operated independently (e.g., Stand-Alone (SA)) of the first network 292 (e.g., the legacy network), or may be operated in connection (e.g., Non-Stand Alone (NSA)). For example, the 5G network may have only an access network (e.g., a 5G radio access network (RAN) or a next generation RAN (NG RAN)), and may have no core network (e.g., a next generation core (NGC)). In this case, the electronic device 101 may access the access network of the 5G network, and then access an external network (e.g., internet) under control of the core network (e.g., an evolved packed core (EPC)) of the legacy network. Protocol information (e.g., LTE protocol information) for the communication with the legacy network or protocol information (e.g., NR protocol information) for the communication with the 5G network may be stored in the memory 230, and accessed by other component (e.g., the processor 120, the first communication processor 212, or the second communication processor 214).

Figure 3A:
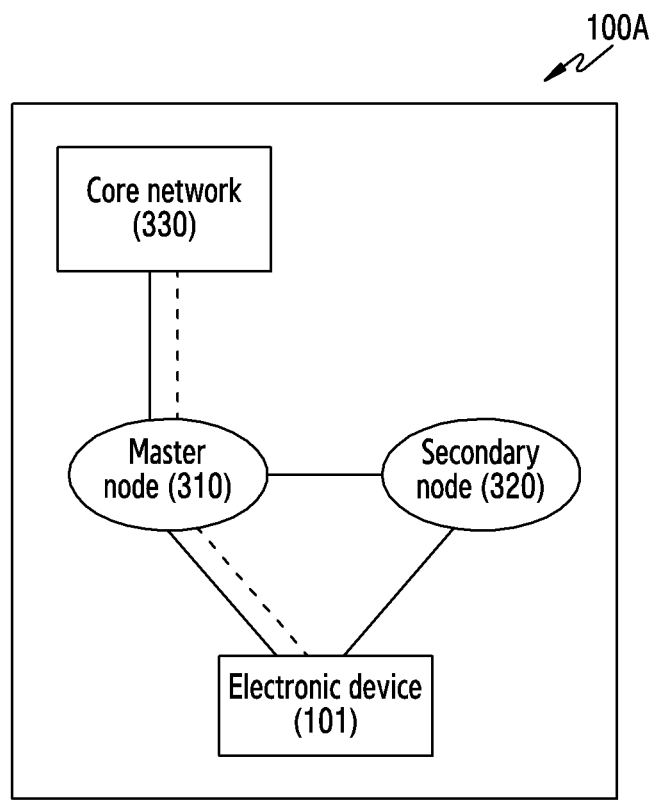
FIGS. 3A through 3C are diagrams illustrating a wireless communication system for providing networks of legacy communication and/or 5G communication according to various embodiments.
Figure 3B:
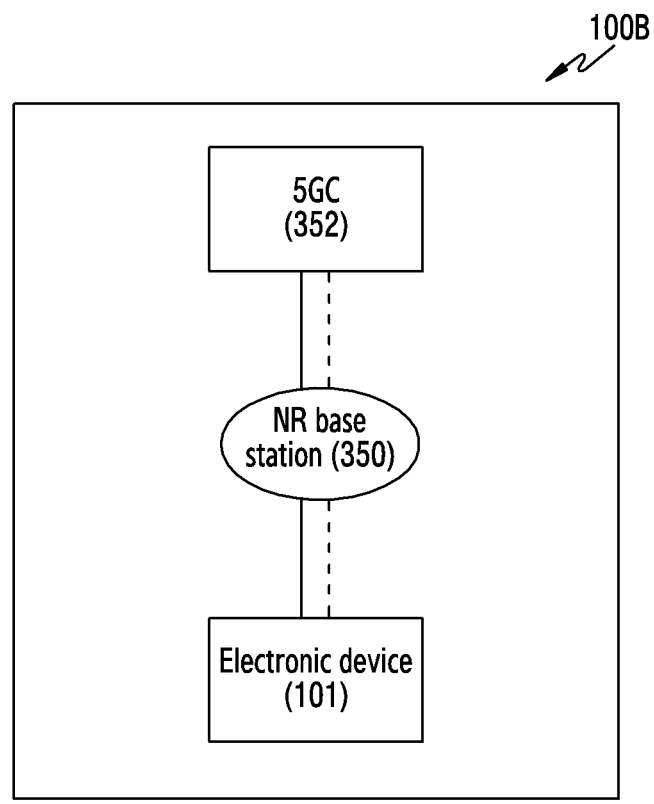
Figure 3C:
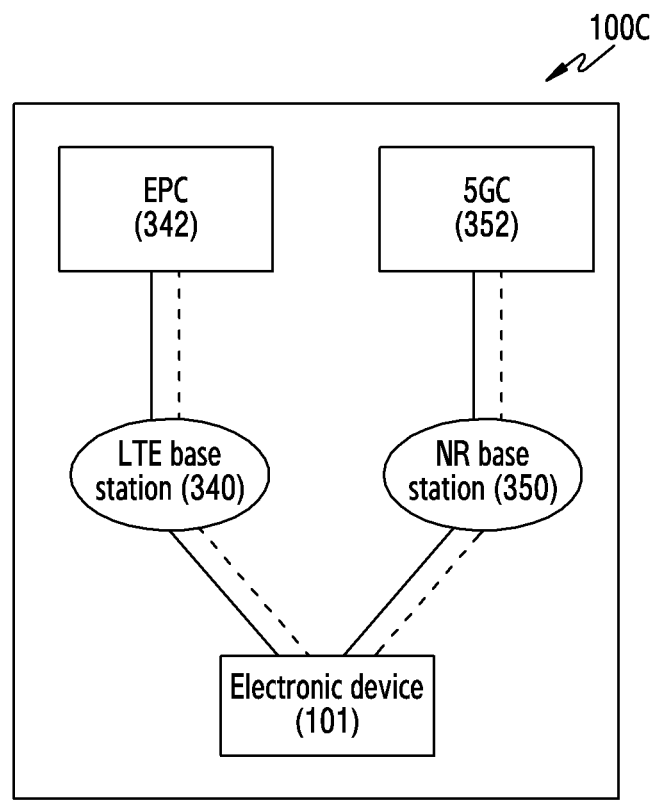

FIGS. 3A through 3C are diagrams illustrating wireless communication systems for provide a network of legacy communication and/or 5G communication according to various embodiments. Referring to FIGS. 3A through 3C, network environments 100A through 100C may include at least one of a legacy network and a 5G network. The legacy network may include, for example, a 4G or LTE base station 340 (e.g., an eNodeB (eNB)) of 3GPP standard supporting wireless access with an electronic device 101 and an evolved packet core (EPC) 342 for managing 4G communication. The 5G network may include, for example, an NR base station 350 (e.g., a gNodeB (gNB)) for supporting wireless access with the electronic device 101 and a 5th generation core (5GC) 352 for managing 5G communication of the electronic device 101.

According to various embodiments, the electronic device 101 may transmit and receive a control message and user data through the legacy communication and/or the 5G communication. The control message may include, for example, a message related to at least one of security control, bearer setup, authentication, registration, or mobility management of the electronic device 101. The user data may indicate, for example, user data excluding control messages transmitted and received between the electronic device 101 and a core network 330 (e.g., the EPC 342).

Referring to FIG. 3A, the electronic device 101 according to an embodiment may transmit and receive at least one of the control message or the user data to and from at least part (e.g., the NR base station 350, the 5GC 352) of the 5G network using at least part (e.g., the LTE base station 340, the EPC 342) of the legacy network.

According to various embodiments, the network environment 100A may provide wireless communication dual connectivity (DC) to the LTE base station 340 and the NR base station 350, and include a network environment for transmitting and receiving control messages to and from the electronic device 101 through one core network 330 of the EPC 342 or the 5GC 352.

According to various embodiments, in the DC environment, one base station of the LTE base station 340 or the NR base station 350 may operate as a master node (MN) 310 and the other may operate as a secondary node (SN) 320. The MN 310 may be connected to the core network 330 and transmit and receive control messages. The MN 310 and the SN 320 may be connected through a network interface and transmit and receive messages related to radio resource (e.g., communication channel) management.

According to various embodiments, the MN 310 may include the LTE base station 340, the SN 320 may include the NR base station 350, and the core network 330 may include the EPC 342. For example, the control message may be transmitted and received through the LTE base station 340 and the EPC 342, and the user data may be transmitted and received through the LTE base station 340 and the NR base station 350.

According to various embodiments, the MN 310 may include the NR base station 350, the SN 320 may include the LTE base station 340, and the core network 330 may include the 5GC 352. For example, the control message may be transmitted and received through the NR base station 350 and the 5GC 352, and the user data may be transmitted and received through the NR base station 350 and the LTE base station 340.

According to various embodiments, both of the MN 310 and the SN 320 may include the NR base station 350, and the core network 330 may include the 5GC 352. For example, the control message may be transmitted and received through a first NR base station and the 5GC 352, and the user data may be transmitted and received through the first NR base station and a second NR base station.

Referring to FIG. 3B, according to various embodiments, the 5G network may include the NR base station 350 and the 5GC 352, and transmit and receive control messages and user data independently of the electronic device 101.

Referring to FIG. 3C, the legacy network and the 5G network according to various embodiments may independently provide data transmission and reception. For example, the electronic device 101 and the EPC 342 may transmit and receive control messages and user data through the LTE base station 340. As another example, the electronic device 101 and the 5GC 352 may transmit and receive control messages and user data through the NR base station 350.

According to various embodiments, the electronic device 101 may be registered in at least one of the EPC 342 or the 5GC 352 and transmit and receive a control message.

According to various embodiments, the EPC 342 or the 5GC 352 may interwork to manage the communication of the electronic device 101. For example, movement information of the electronic device 101 may be transmitted and received through an interface between the EPC 342 and the 5GC 352.

Figure 4:
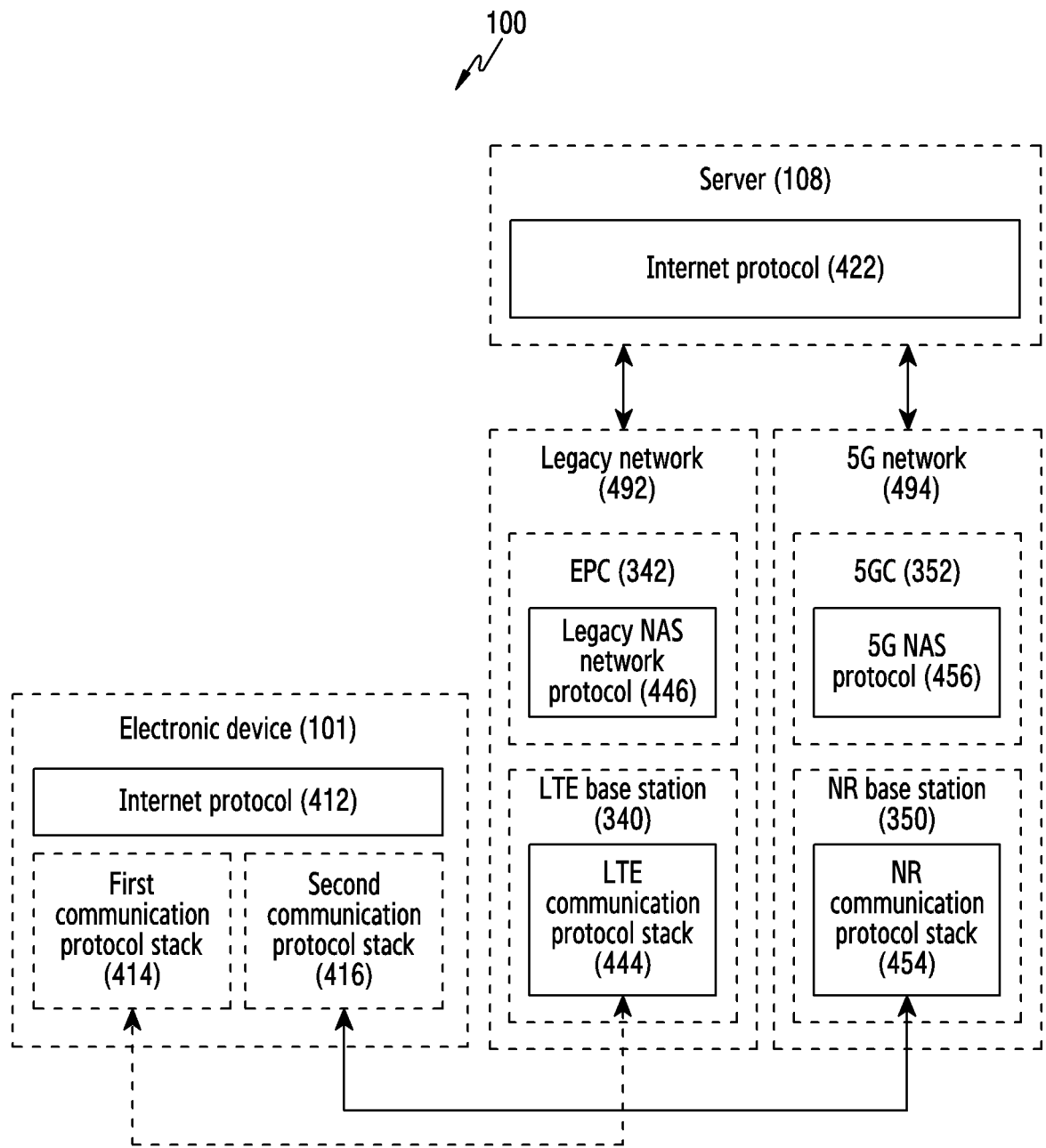
FIG. 4 is a diagram illustrating a protocol stack structure of a legacy communication and/or 5G communication network according to an embodiment.

FIG. 4 is a diagram illustrating a protocol stack structure of a network 100 of legacy communication and/or 5G communication according to an embodiment. According to the embodiment illustrated, the network 100 may include an electronic device 101, a server 108, a legacy network 492 and a 5G network 494.

The electronic device 101 may include an internet protocol 412, a first communication protocol stack 414 and a second communication protocol stack 416. The electronic device 101 may communicate with the server 108 over the legacy network 492 and/or the 5G network 494.

According to an embodiment, the electronic device 101 may perform internet communication associated with the server 108 using the internet protocol 412 (e.g., transmission control protocol (TCP), user datagram protocol (UDP), and/or internet protocol (IP)). The internet protocol 412 may be executed, for example, at a main processor (e.g., the main processor 121 of FIG. 1) included in the electronic device 101.

According to another embodiment, the electronic device 101 may wirelessly communicate with the legacy network 492 using the first communication protocol stack 414. According to yet another embodiment, the electronic device 101 may wirelessly communicate with the 5G network 494 using the second communication protocol stack 416. The first communication protocol stack 414 and the second communication protocol stack 416 may be executed, for example, at one or more communication processors (e.g., the wireless communication module 192 of FIG. 1) included in the electronic device 101.

The server 108 may include an internet protocol 422. The server 108 may transmit and receive data related to the internet protocol 422 to and from the electronic device 101 over the legacy network 492 and/or the 5G network 494. According to an embodiment, the server 108 may include a cloud computing server existing outside the legacy network 492 or the 5G network 494. In another embodiment, the server 108 may include an edge computing server (or a mobile edge computing (MEC) server) located inside at least one of the legacy network 492 or the 5G network 494.

The legacy network 492 may include an LTE base station 340 and an EPC 342. The LTE base station 340 may include an LTE communication protocol stack 444. The EPC 342 may include a legacy non-access stratum (NAS) protocol 446. The legacy network 492 may perform LTE wireless communication with the electronic device 101 using the LTE communication protocol stack 444 and the legacy NAS protocol 446.

The 5G network 494 may include an NR base station 350 and a 5GC 352. The NR base station 350 may include an NR communication protocol stack 454. The 5GC 352 may include a 5G NAS protocol 456. The 5G network 494 may perform NR wireless communication with the electronic device 101 using the NR communication protocol stack 454 and the 5G NAS protocol 456.

According to an embodiment, the first communication protocol stack 414, the second communication protocol stack 416, the LTE communication protocol stack 444 and the NR communication protocol stack 454 may include a control plane protocol for transmitting and receiving control messages and a user plane protocol for transmitting and receiving user data. The control message may include, for example, a message related to at least one of security control, bearer setup, authentication, registration or mobility management. The user data may include, for example, other data than the control message.

According to an embodiment, the control plane protocol and the user plane protocol may include physical (PHY), medium access control (MAC), radio link control (RLC) or packet data convergence protocol (PDCP) layers. The PHY layer may, for example, channel-code and modulate data received from an upper layer (e.g., the MAC layer), transmit it over a wireless channel, demodulate and decode data received over the wireless channel, and transmit it to the upper layer. The PHY layer included in the second communication protocol stack 416 and the NR communication protocol stack 454 may further perform an operation related to the beamforming. The MAC layer may, for example, logically/physically map to the wireless channel for transmitting and receiving the data, and perform hybrid automatic repeat request (HARQ) for error correction. The RLC layer may conduct, for example, data concatenation, segmentation, or reassembly, and perform sequence detection, reordering, or duplicate detection of the data. The PDCP layer may perform, for example, operations related to ciphering and data integrity of the control data and the user data. The second communication protocol stack 416 and the NR communication protocol stack 454 may further include a service data adaptation protocol (SDAP). The SDAP may, for example, manage radio bearer allocation based on quality of service (QoS) of the user data.

According to various embodiments, the control plane protocol may include a radio resource control (RRC) layer and a NAS layer. The RRC layer may process, for example, control data related to radio bearer setup, paging, or mobility management. The NAS may process, for example, control messages related to authentication, registration, and mobility management.

Figure 5:
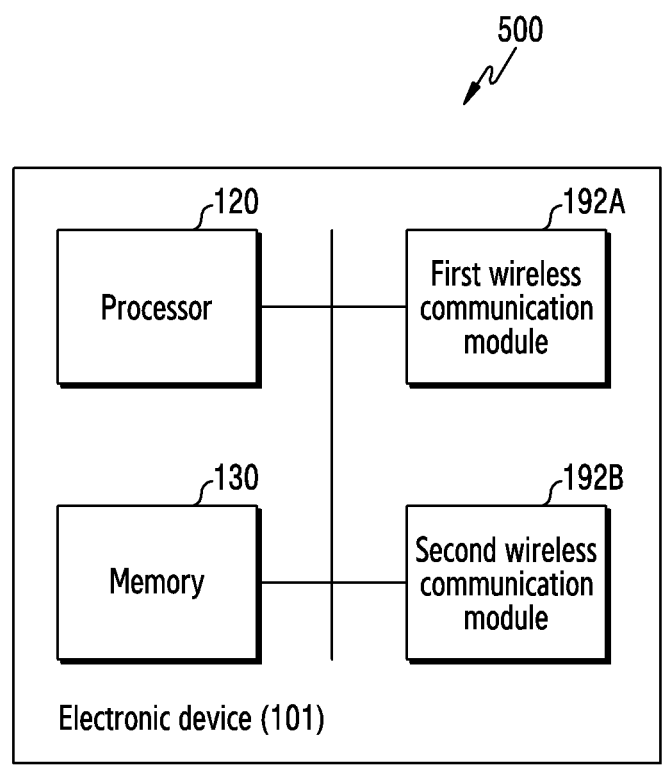
FIG. 5 is a block diagram of an electronic device for operating in a dual connectivity environment, according to various embodiments.

FIG. 5 is a block diagram 500 of an electronic device 101 for operating in a dual connectivity environment, according to various embodiments. The electronic device 101 may include various components shown in FIG. 1, but only a processor 120, a first wireless communication module 192A, and a second wireless communication module 192B and a memory 130 are shown in FIG. 5, for simple explanations.

In the embodiment illustrated, the first wireless communication module 192A may be configured to provide first wireless communication using a first frequency range, and may include a first communication protocol stack (e.g., the first communication protocol stack 414 of FIG. 3). The second wireless communication module 192B may be configured to provide second wireless communication using a second frequency range, and may include a second communication protocol stack (e.g., the second communication protocol stack 416 of FIG. 3). If the first wireless communication and the second wireless communication are the same, the first wireless communication module 192A and the second wireless communication module 192B may be implemented as a single circuit.

The processor 120 may be operatively connected to the first wireless communication module 192A and the second wireless communication module 192B and control operations of the first wireless communication module 192A and the second wireless communication module 192B. The memory 130 may be operatively connected to the processor 120, and store instructions executed by the processor 120, and the processor 120 may read and execute the instructions from the memory 130. The memory 130 may additionally store SN information for providing the second wireless communication. The information may be stored in the form of a database (DB). The electronic device 101 may search and measure an SN (e.g., the secondary node 320 of FIG. 3A) which may be connected with the second wireless communication using the information stored in the memory 130, without obtaining configuration information for searching and measuring the SN (e.g., the secondary node 320 of FIG. 3A) which may be connected with the second wireless communication from an MN (e.g., the master node 310 of FIG. 3A) connected with the first wireless communication.

According to various embodiments, an electronic device (e.g., the electronic device 101) may include a first communication circuit (e.g., the first wireless communication module 192A of FIG. 5) configured to provide first wireless communication using a first frequency range, a second communication circuit (e.g., the second wireless communication module 192B of FIG. 5) configured to provide second wireless communication using a second frequency range, a processor (e.g., the processor 120 of FIG. 1 or FIG. 5) operatively connected with the first communication circuit and the second communication circuit, and a memory (e.g., the memory 130 of FIG. 1 or FIG. 5) operatively connected with the processor, and configured to store at least one first measurement configuration information, wherein the memory may store instructions for, when executed, causing the processor to, using the first communication circuit, perform communication connection with an MN base station (e.g., the MN 310 of FIG. 3A) operating as an MN, while performing the communication connection with the MN base station, measure a state of a signal from at least one base station for operating as an SN using the at least one first measurement configuration information, using the second communication circuit, and transmit a first message including at least part of the measurement result, to the MN base station.

According to various embodiments, the instructions may cause the processor (e.g., the processor 120 of FIG. 1 or FIG. 5) to receive a second message from the MN base station (e.g., the MN 310 of FIG. 3A), a second message including at least one second measurement configuration information for performing signal state measurement using the second communication circuit (e.g., the second wireless communication module 192B of FIG. 5), and transmit the first message including at least part of the measurement result, to the MN base station, based on the at least one second measurement configuration information.

According to various embodiments, the instructions may cause the processor (e.g., the processor 120 of FIG. 1 or FIG. 5) to, based on the at least one second measurement configuration information, update and store the at least one first configuration information in the memory (e.g., the memory 130 of FIG. 1 or FIG. 5).

According to various embodiments, the instructions may cause the processor (e.g., the processor 120 of FIG. 1 or FIG. 5) to receive from the MN base station (e.g., the MN 310 of FIG. 3A), a third message including information an SN base station (e.g., the SN 320 of FIG. 3A) for operating as a secondary node selected based on the first message, and perform communication connection with the SN base station.

According to various embodiments, the instructions may cause the processor (e.g., the processor 120 of FIG. 1 or FIG. 5) to store measurement configuration information obtained based on system information of the communication-connected SN base station (e.g., the SN 320 of FIG. 3A) in the memory (e.g., the memory 130 of FIG. 1 or FIG. 5) to be included in the at least one first measurement configuration information.

According to various embodiments, the instructions may cause the processor (e.g., the processor 120 of FIG. 1 or FIG. 5) to determine validity with respect to the at least one first measurement configuration information, and based on the determination result, measure a state of a signal from at least one base station for operating as the secondary node using the first measurement configuration information determined to be valid.

According to various embodiments, the instructions may cause the processor (e.g., the processor 120 of FIG. 1 or FIG. 5) to, during the communication connection with the MN base station (e.g., the MN 310 of FIG. 3A), determine whether communication connection with the base station for operating as the secondary node is necessary based on an amount of packets accumulated at the electronic device (e.g., the electronic device 101) while waiting for transmission, a QoS requested by an application executed in the electronic device, or attribute information of the application, and as a result of the determination, measure the state of the signal from at least one base station for operating as the secondary node only if determining that the communication connection with the base station for operating as the secondary node is necessary.

According to various embodiments, the instructions may cause the processor (e.g., the processor 120 of FIG. 1 or FIG. 5) to set a valid time with respect to the at least one first measurement configuration information, and determine that the first measurement configuration information is valid, based on the valid time.

According to various embodiments, the valid time may be set differently according to mobility of the electronic device (e.g., the electronic device 101).

According to various embodiments, the instructions may cause the processor (e.g., the processor 120 of FIG. 1 or FIG. 5) to store the at least one first measurement configuration information in association with at least one MN base station, and determine that first measurement configuration information associated with the MN base station (e.g., the MN 310 of FIG. 3A) which performs the communication connection is valid among the at least one first measurement configuration information.

According to various embodiments, the instructions may cause the processor to determine a start timing for measuring the state of the signal from at least one base station for operating as the secondary node by using the at least one first measurement configuration information based on a timing of recognizing that a network supports a dual connectivity environment based on information received from the MN base station (e.g., the MN 310 of FIG. 3A).

According to various embodiments, the instructions may cause the processor (e.g., the processor 120 of FIG. 1 or FIG. 5) to calculate a time required to measure the state of the signal from at least one base station for operating as the SN using the at least one first measurement configuration information, and based on the calculation result, determine the measurement start timing for measuring the state of the signal from at least one base station for operating as the SN using the at least one first measurement configuration information.

According to various embodiments, an electronic device (e.g., the electronic device 101) may include a first communication circuit (e.g., the first wireless communication module 192A of FIG. 5) configured to provide first wireless communication using a first frequency range, a second communication circuit (e.g., the second wireless communication module 192B of FIG. 5) configured to provide second wireless communication using a second frequency range, a processor (e.g., the processor 120 of FIG. 1 or FIG. 5) operatively connected with the first communication circuit and the second communication circuit, and a memory (e.g., the memory 130 of FIG. 1 or FIG. 5) operatively connected with the processor, and configured to store at least one base station information, wherein the memory may store instructions for, when executed, causing the processor to, using the first communication circuit, perform communication connection with a first base station 910, while performing the communication connection with the first base station 910, select at least one second base station 920, based at least in part on information of the first base station 910 and the at least one base station information, measure a communication state of the at least one second base station 920 selected, based one a signal received from the at least one second base station 920 selected, using the second communication circuit, after the measurement, receive a first message including at least one frequency information for performing communication state measurement using the second communication circuit, from the first base station 910, and transmit a second message including at least part of the measurement result, to the first base station 910, based on the at least one frequency information.

According to various embodiments, the at least one base station information may include information of at least one base station connected by the electronic device (e.g., the electronic device 101) using the first communication circuit (e.g., the first wireless communication module 192A of FIG. 5) and information of at least one other base station connected using the second communication circuit during communication connection with the at least one base station.

According to various embodiments, the instructions may cause the processor (e.g., the processor 120 of FIG. 1 or FIG. 5) to receive a third message including information of a second base station selected based on the second message, from the first base station, and connect communication with the selected second base station.

According to various embodiments, the instructions may cause the processor (e.g., the processor 120 of FIG. 1 or FIG. 5) to operate according to 3GPP standard, the first base station 910 may be included in an MN, the second base station 920 may be included in an SN, the first message may include an RRC connection reconfiguration message, the second message may include a measurement reporting message, and the third message may include an SN addition configuration message.

According to various embodiments, the MN 910 may include an LTE base station, and the SN 920 may include a 5G or NR base station.

Figure 6:
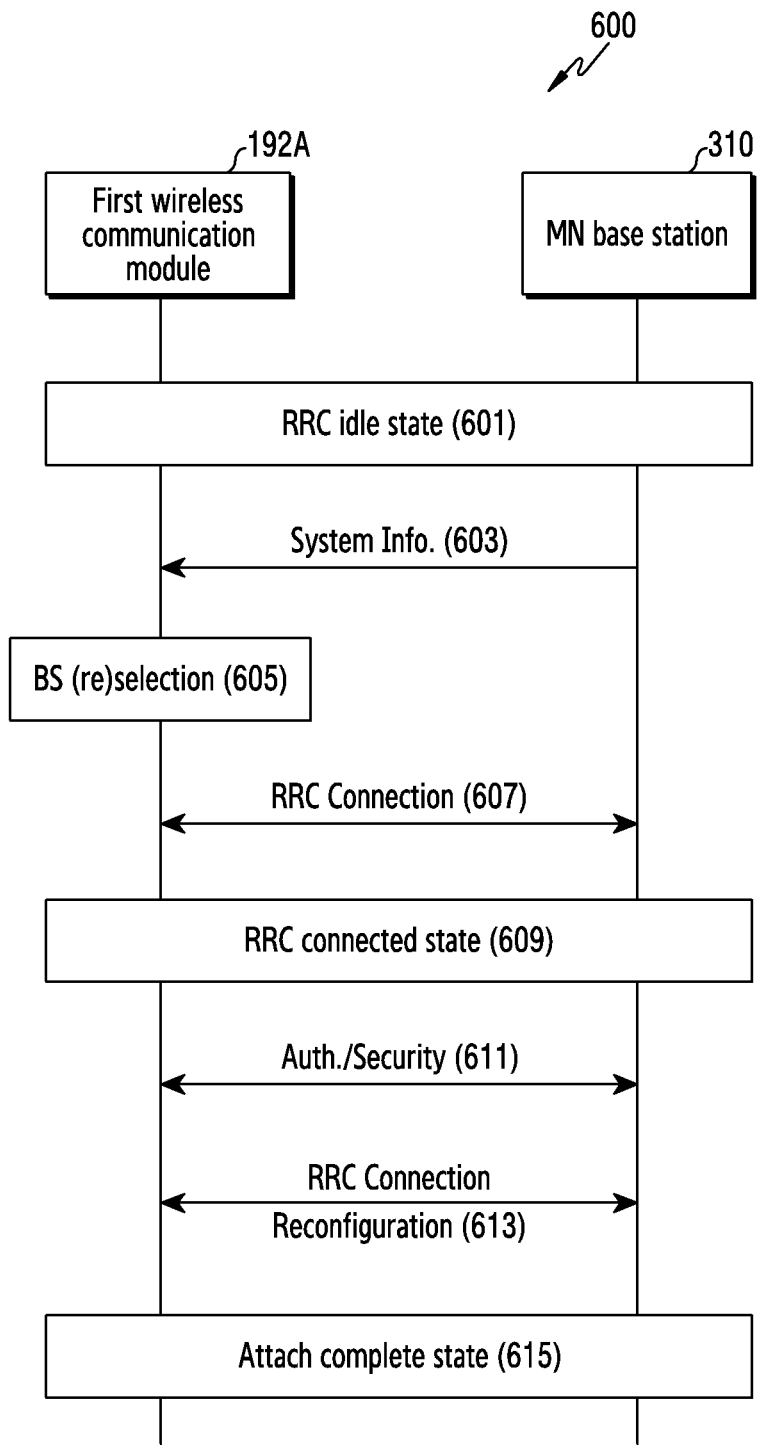
FIG. 6 is a flowchart illustrating operations for performing communication connection between an electronic device and a master node (MN) base station according to an embodiment.

FIG. 6 is a flowchart 600 illustrating operations for performing communication connection between an electronic device 101 and an MN base station 310 according to an embodiment. The MN base station 310 may be a base station operating as the MN. The MN base station 310 may be simply referred to as the MN, or may be referred to as a first base station.

FIG. 6 briefly illustrates the operations on the assumption that the MN base station 310 and the first wireless communication module 192A of the electronic device 101 communicate using the LTE communication protocol. If the communication protocol supported by the first wireless communication module 192A and the MN base station 310 is the NR communication protocol, they may be changed in conformity with the NR communication protocol. The MN base station 310 shown in FIG. 6 may be the LTE base station 340 or the NR base station 350.

Referring to FIG. 6, in operation 601, the electronic device 101 including the first wireless communication module 192A may be in an RRC idle state. The electronic device 101 in the idle state may be disconnected from the MN base station 310 in the communication. If there is data to transmit or an application requiring data transmission operates, the processor 120 may instruct communication connection configuration to the first wireless communication module 192A. In response, the first wireless communication module 192A may initiate the communication connection configuration.

According to various embodiments, in operation 603, the first wireless communication module 192A may acquire system information periodically broadcasted by the MN base station 310. The system information may include information required for the first wireless communication module 192A to connect the MN base station 310 for communication.

According to various embodiments, in operation 605, if obtaining the system information from a plurality of base stations which may operate as master nodes, the first wireless communication module 192A may select a base station to perform the communication connection. As an example, the first wireless communication module 192A may select a base station having the greatest received signal strength.

According to various embodiments, in operation 607, the first wireless communication module 192A may perform communication connection with the MN base station 310 which is the base station selected in operation 605. In the LTE communication protocol, it starts by transmitting a signal through a random access channel (RACH), RRC connection is completed if receiving from the MN base station 310 a message indicating that the RRC connection is completed, and the first wireless communication module 192A may be switched to an RRC connected state 609.

According to various embodiments, in operation 611, the first wireless communication module 192A and the MN base station 310 may exchange authentication and security related messages. According to various embodiments, in operation 613, the first wireless communication module 192A and the MN base station 310 may reconfigure the RRC connection configuration. According to various embodiments, in operation 615, the first wireless communication module 192A may enter an access complete state to complete the communication connection with the MN base station 310, and transmit and receive data through the MN base station 310.

After completing the communication connection with the MN base station 310, the electronic device 101 may obtain measurement configuration information for measuring base stations for operating as the SN from the MN base station 310. The base station operating as the SN may be referred to as an SN base station, or may be referred to as an SN or a second base station. The measurement configuration information may include frequency information to be measured, timing information and/or an identification number (e.g., a physical cell ID) of a cell formed by the base station. After obtaining the measurement configuration information, the electronic device 101 may search a signal transmitted from at least one base station for operating as the SN, measure it, and report a measurement result to the MN base station 310. However, it may take a considerable time for the electronic device 101 to perform such an operation. For example, if at least one base station for operating as the SN in an NSA system in which the LTE and the NR coexist uses an NR communication method in a frequency band below 6 GHz, a measurement gap which is a time band for measuring the signal of the base station for adding the SN needs to be used together with the LTE communication method supported by the MN base station 310 and thus considerable delay may occur until quality measurement. In addition, if at least one base station for operating as the SN uses the NR communication method in a frequency band over 6 GHz, since both of the base station for operating as the SN and the electronic device 101 use a plurality of beams by the beamforming and quality measurement must be performed on every combination of beams of the base station operating as the SN and the electronic device 101, it may take a considerable time to conduct the measurement.

According to various embodiments, the electronic device 101 may quickly complete the connection to the base station operating as the SN, and reduce power consumption used to connect the base station operating as the SN in the electronic device 101.

Figure 7:
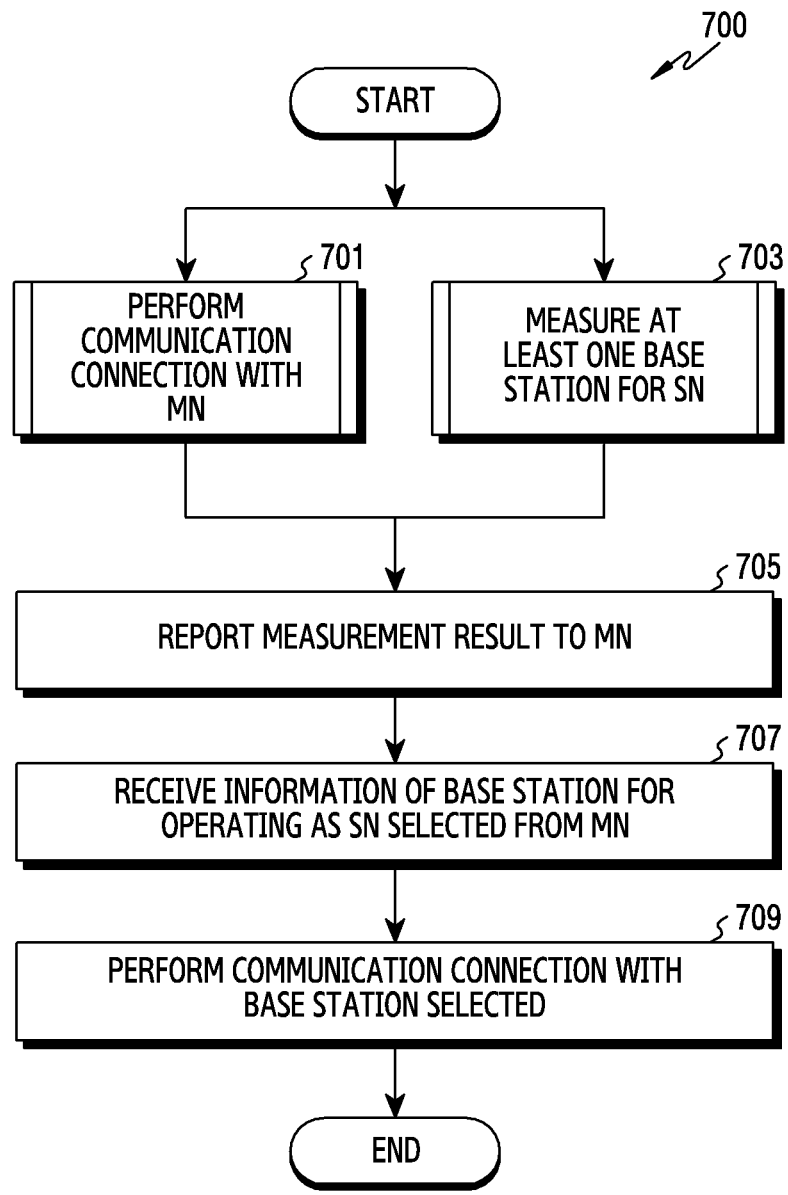
FIG. 7 is a flowchart illustrating operations for performing communication connection with an MN base station and an SN base station for dual connectivity of an electronic device according to various embodiments.

FIG. 7 is a flowchart 700 illustrating operations for performing communication connection with an MN base station 310 and an SN base station 320 for dual connectivity of an electronic device 101 according to various embodiments. An operation entity of the flowchart 700 shown in FIG. 7 may be understood as an electronic device (e.g., the electronic device 101 of FIG. 1) or a component (e.g., the processor 120 of FIG. 5, the first wireless communication module 192A and/or the second wireless communication module 192B of FIG. 5) of the electronic device 101.

According to various embodiments, in operation 701, the electronic device 101 (e.g., the processor 120) may perform communication connection with the MN base station 310 using the first wireless communication module 192A. The electronic device 101 may perform the communication connection with the MN base station 310 according to a first communication protocol supported by the MN base station 310. In an embodiment, if the MN base station 310 and the first wireless communication module 192A support the LTE communication protocol, the electronic device 101 may perform the communication connection according to the flowchart of FIG. 6 describe d above.

According to various embodiments, in operation 703, a measurement operation for at least one base station for operating as an SN may be performed during the operation of performing the communication connection with the MN base station 310. According to various embodiments, the first wireless communication module 192A may perform the communication connection with the MN base station 310, and the second wireless communication module 192B may substantially concurrently measure a signal strength from at least one base station, by searching at least one base station for operating as the SN. The electronic device 101 according to various embodiments may reduce a communication connection configuration time of the SN base station 320 for the dual connectivity by performing the communication connection operation for the MN base station 310 and the measurement operation for at least one base station for operating as the SN at the same time or before the communication connection operation complete.

According to various embodiments, in operation 705, the electronic device 101 (e.g., the processor 120, the first wireless communication module 192A) may report a measurement result to the MN base station 310. At this time, the electronic device 101 may report the measurement result of at least one base station for operating as the SN to the MN base station 310.

According to various embodiments, the electronic device 101 may enter an RRC connected state (e.g., the RRC connected state 609 of FIG. 6) in which the RRC connection to the MN base station 310 is completed and then report the measurement result based at least in part on measurement configuration information received from the MN base station 310. According to various embodiments, the electronic device 101 may determine whether at least one measurement configuration information used in measurement for selecting an SN base station previously performed includes the same measurement configuration information received from the MN base station 310, and selectively report only a measurement result using the same measurement configuration information to the MN base station 310. Also, the electronic device 101 may selectively report to the MN base station 310 only a measurement result estimated to be the measurement based on the same measurement configuration information. As an embodiment, if the measurement configuration information received at the electronic device 101 from the MN base station 310 includes a physical cell ID of a cell formed by the base station to be measured, and a cell having the same physical cell ID is already measured, its measurement result may be reported to the MN base station 310. As another embodiment, if the measurement configuration information received by the electronic device 101 from the MN base station 310 includes information of a center frequency and a bandwidth to measure and measurement results of the same center frequency and bandwidth, measurement results may be reported to the MN base station 310. If the center frequency is the same but the bandwidth is different, the electronic device 101 may convert the measurement result according to the bandwidth included in the measurement configuration information received from the MN base station 310, and report the converted measurement result to the MN base station 310.

According to various embodiments, if there is no measurement result based on the same measurement configuration information as the measurement configuration information received from the MN base station 310, the electronic device 101 may select whether to perform a new measurement according to the measurement configuration information received from the MN base station 310, or to report at least part of a measurement result previously conducted.

For example, if there is no measurement result based on the same measurement configuration information as the measurement configuration information received from the MN base station 310, the electronic device 101 may ignore the measurement result previously performed, perform a new measurement according to the measurement configuration information received from the MN base station 310, and transmit its measurement result to the MN base station 310. As another example, if there is no measurement result based on the same measurement configuration information as the measurement configuration information received from the MN base station 310, the electronic device 101 may transmit at least part of the measurement result previously conducted.

According to various embodiments, if the measurement is completed without receiving the measurement configuration information from the MN base station 310, the electronic device 101 may report the measurement result to the MN base station 310. The measurement result reported by the electronic device 101 may be used as a criterion of the MN base station 310 for determining to add the SN base station 320. If the electronic device 101 receives no measurement configuration information from the MN base station 310, there may be no reporting configuration information included in the measurement configuration information. According to an embodiment, the electronic device 101 may store default reporting configuration information in association with the MN base station 310, and if having no reporting configuration information of a specific MN base station 310, the electronic device 101 may transmit the measurement result to the MN base station 310 using the default reporting configuration. For example, the default reporting configuration may be preset and stored in the electronic device 101 or received from the network. According to another embodiment, if receiving no measurement configuration information, the electronic device 101 may define an RRC signaling message which may be used to transmit a measurement result arbitrarily measured by the electronic device 101 to the MN base station 310, and transmit the measurement result to the MN base station 310 using this message.

According to another embodiment, if the electronic device 101 receives no measurement configuration information, the electronic device 101 may transmit the measurement result to the MN base station 310 using an RRC signaling message (e.g., UE assistance information) predefined to transmit the measurement result arbitrarily measured by the electronic device 101 to the MN base station 310. If such a method is used, the electronic device 101 may receive necessary information for the communication connection with the SN base station through a first RRC connection reconfiguration message (e.g., 613 of FIG. 6) during the communication connection operation between the electronic device 101 and the MN base station 310.

According to various embodiments, in operation 707, the electronic device 101 (e.g., the processor 120, the first wireless communication module 192A) may receive information of a base station selected to operate as the SN from the MN base station 310. The MN base station 310 may receive a measurement result from the electronic device 101 according to various methods described above, select the SN base station 320 to which the electronic device 101 is to connect the communication based on the received measurement result, and forward related information to the electronic device 101.

According to various embodiments, in operation 709, the electronic device 101 (e.g., the processor 120, the second wireless communication module 192B) may perform communication connection with the base station selected by the MN base station 310 based on the information received from the MN base station 310. The base station connected in the communication may operate as the SN base station 320.

Figure 8:
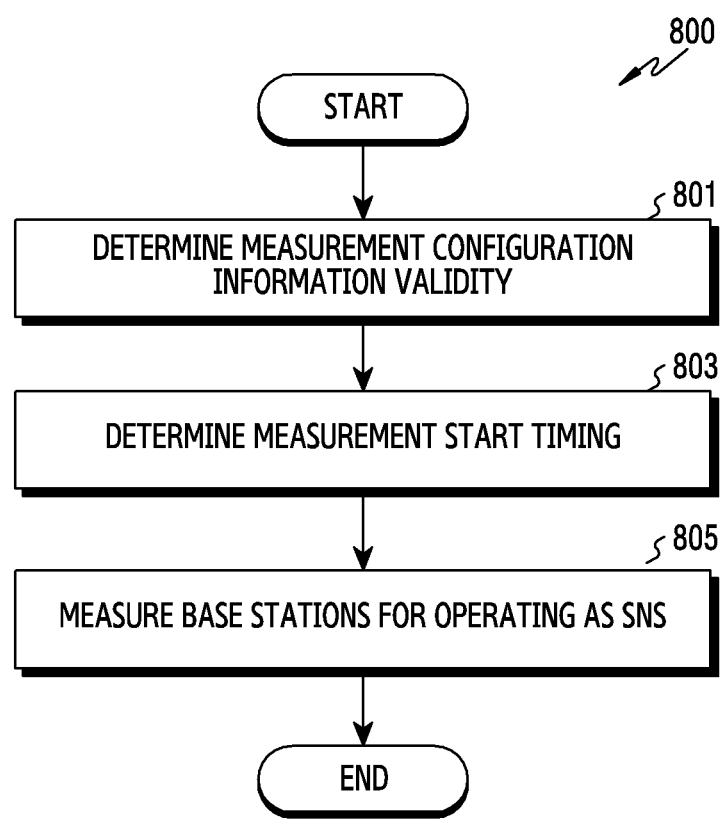
FIG. 8 is a flowchart illustrating operations of an electronic device for measuring at least one base station for operating as an SN according to various embodiments.

FIG. 8 is a flowchart 800 illustrating operations of an electronic device 101 for measuring at least one base station operating as an SN according to various embodiments. The flowchart 800 shown in FIG. 8 is an embodiment of operation 703 of FIG. 7, and its operating entity may be understood as an electronic device (e.g., the electronic device 101 of FIG. 1) or a component (e.g., the processor 120 of FIG. 1) of the electronic device 101.

Referring to FIG. 8, in operation 801, the electronic device 101 (e.g., the processor 120) may determine validity of measurement configuration information stored. If there is no valid measurement configuration information, measurement for communication connection with the SN may not be performed.

According to various embodiments, the electronic device 101 may store measurement configuration information for a base station for operating as the SN. According to an embodiment, the electronic device 101 may store measurement configuration information previously received from the MN base station 310. According to another embodiment, the electronic device 101 may acquire and store measurement configuration information based on the information of the SN base station 320 previously connected. For example, it may acquire and store measurement configuration information based on frequency information and timing information obtained while conducting data transmission with the SN base station 320. The electronic device 101 may determine the validity of the stored measurement configuration information.

According to various embodiments, the electronic device 101 may set a valid time for each of the stored measurement configuration information and determine validity based on the valid time. Measurement configuration information beyond the valid time may be deleted from a storage device or displayed as invalid data. According to various embodiments, the valid time may be reset if measurement is conducted by the electronic device 101 based on measurement configuration information. Alternatively, the measurement may be conducted by the electronic device 101 and then the valid time may be reset based on the measurement result. Alternatively, the measurement for the communication connection with the SN may be performed by the electronic device 101 and then the valid time may be reset for measurement configuration information substantially used as the measurement for the communication connection with the SN.

According to various embodiments, the valid time may be set to a different value according to mobility of the electronic device 101. As an embodiment, the valid time may be set short if the mobility of the electronic device 101 is high, whereas the valid time may be set long if the mobility is low.

According to various embodiments, the electronic device 101 may store the above-described measurement configuration information in association with the MN base station 310. The electronic device 101 may store the measurement configuration information obtained from the MN base station 310 and the measurement configuration information obtained based on the SN base station 320 which is connected in the communication with the MN base station 310 connected in the connection and builds the dual connectivity environment in association with recognition information (e.g., recognition information (e.g., physical cell ID) of the cell formed by the MN, and a base station ID of the MN base station) of the MN base station 310. In addition, the electronic device 101 may recognize only the measurement configuration information stored in association with the MN base station 310 which is connected in the communication as the valid measurement configuration information.

According to various embodiments, the electronic device 101 may determine the validity of the measurement configuration information using the validity time and/or the MN base station recognition information. The electronic device 101 may determine the validity of the measurement configuration information based on the validity time alone, or determine the validity of the measurement configuration information based on the associated MN base station recognition information alone, or determine the validity of the measurement configuration information based on both of the associated MN base station recognition information and the validity time.

According to various embodiments, the electronic device 101 may extract at least one valid measurement configuration information which may be used to select the SN base station 320 based on the above-described determination. For example, if determining no valid measurement configuration information, the electronic device 101 may not perform the measurement on the base station for using as the SN.

In operation 803, the electronic device 101 (e.g., the processor 120, the second wireless communication module 192B) may determine a measurement start timing, if there is the valid base station information and/or measurement configuration information.

According to various embodiments, the electronic device 101 may determine the measurement start time based on a timing of recognizing that the network may support the dual connectivity. If receiving information indicating an SN (e.g., upperlayerindicator of system information block 2 (SIB2) of LTE) through system information received from the MN base station 310, the electronic device 101 may determine that the network supports the dual connectivity. The electronic device 101 may determine that the network supports the dual connectivity if a dual connectivity item is included in a radio access technology (RAT)—type of 'UE capability enquiry' which is an RRC message received from the MN base station 310. The electronic device 101 may determine whether the network supports the dual connectivity through 'RestrictDCNR' information which is set to limit the dual connectivity using NR included in an 'Attach Accept' message received from the MN base station 310. According to an embodiment, the electronic device 101 may determine the measurement start time, after receiving at least one of the above-mentioned information and recognizing that the network supports the dual connectivity. If the electronic device 101 starts the measurement right after receiving the system information and recognizing that the network supports the dual connectivity, it may take a long measurement time but the power consumption may be increase more. By contrast, as the electronic device 101 recognizes that the network supports the dual connectivity and then sets the measurement start time later, the power consumption may decrease but the measurable time may be shortened. According to various embodiments, the electronic device 101 may determine the measurement start timing based on the timing of recognizing that the network supports the dual connectivity and an estimated time required for the measurement. In an embodiment, the estimated time required for the measurement may be determined depending on the number of the measurement configuration information to be used for the measurement.

In operation 805, the electronic device 101 (e.g., the processor 120) may turn on the second wireless communication module 192B at the determined measurement start time, and measure base stations for operating as the SN based on at least one valid measurement configuration information.

The above-described operations for the SN base station communication connection may be performed at all time but whether to connect the communication with the SN base station may be determine first and then the above-described operations for the SN communication connection may be conducted if necessary.

For doing so, according to various embodiments, the electronic device 101 (e.g., the processor 120, the second wireless communication module 192B) may first determine whether the communication connection with the base station for operating as the SN is necessary. The SN base station 320 in the dual connectivity may be used to transmit data at a high transmission rate or may be used to satisfy a QoS requested by the service. Hence, according to various embodiments, the electronic device 101 may determine whether the communication connection with the SN base station 320 is required, by referring to an amount of packets accumulated in an internal storage device (e.g., the memory 130) during the communication connection with the MN base station 310. According to various embodiments, the electronic device 101 may determine whether the communication connection with the SN base station 320 is required to satisfy a QoS requested by a QoS flow using configuration information of the QoS flow requested by an application. According to various embodiments, the electronic device 101 may determine whether the communication connection with the SN base station 320 is necessary based on attribute information of an application which causes the communication connection with the MN base station 310. The attribute information of the application may be information of a generation type or a generation cycle, and a message size of a message to transmit or a message to receive of the application. As an embodiment, if an executed application is a social network service (SNS), transmission and reception of short messages dominates and thus it may be determined that the communication connection with the SN base station 320 is not necessary. As another embodiment, if the application executed is a file transfer protocol (FTP) service or a video playback program, it is highly likely that a great amount of packets is continuously transmitted or received and thus it may be determined that the communication connection with the SN base station 320 is required.

Determining of the electronic device 101 whether the communication connection with the SN base station 320 is necessary as described above may be performed before, together with or after determining the validity of the stored measurement configuration information of operation 801, or may be performed before, together with or after determining the measurement start timing for adding the SN base station 320 of operation 803. According to another embodiment, determining of the electronic device 101 whether the communication connection with the SN base station 320 is necessary as described above may be carried out after and anytime between the timing at which the electronic device 101 recognizes that the network may support the dual connectivity and the timing of substantially starting the measurement of the SN base station 320.

So far, the method for reducing the time required to complete the communication connection with the base station for operating as the SN to implement the dual connectivity environment has been explained. Hereafter, a method for communicatively connecting a base station for operating as an SN for realizing a dual connectivity environment according to an embodiment if the above-described method is applied to the first wireless communication which is the LTE system will be described.

Figure 9:
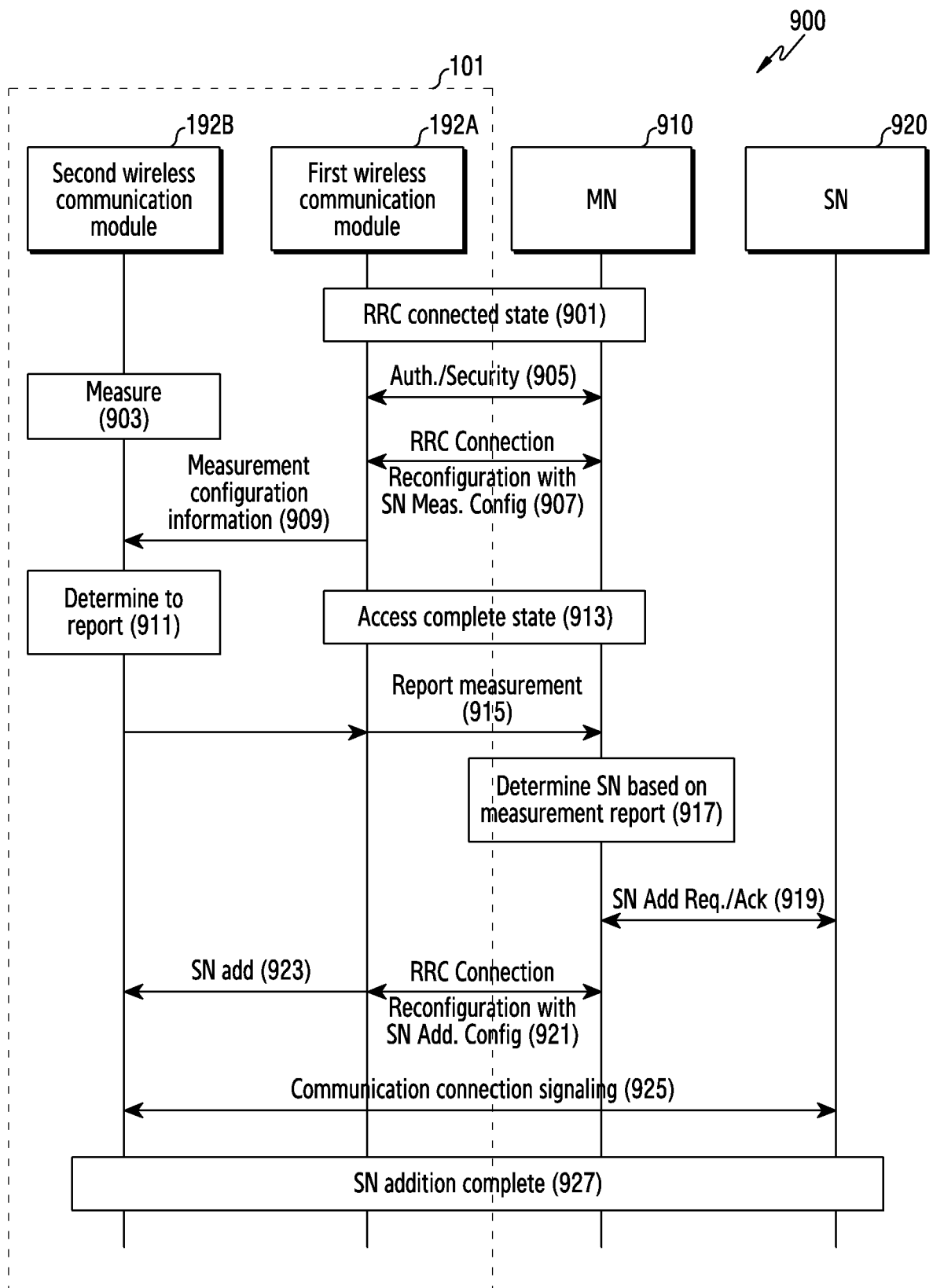
FIG. 9 is a flowchart illustrating operations of an electronic device for performing communication connection with an MN and an SN for dual connectivity according to various embodiments.

FIG. 9 is a flowchart 900 illustrating operations of an electronic device 101 for performing communication connection with an MN and an SN for dual connectivity according to various embodiments. An operating entity of the flowchart 900 shown in FIG. 9 may be understood as an electronic device (e.g., the electronic device 101 of FIG. 1) or a component (e.g., the processor 120 of FIG. 1, the first wireless communication module 192A and/or the second wireless communication module 192B of FIG. 5) of the electronic device 101.

An MN 910 shown in FIG. 9 may be the MN 310 of FIG. 3A, and may be referred to as an MN base station or a first base station, and an SN 920 may be the SN 320 of FIG. 3A, and may be referred to as an SN base station or a second base station.

Referring to FIG. 9, the first wireless communication module 192A of the electronic device 101 may switch from an RRC idle state (e.g., the RRC idle state 601 shown in FIG. 6) to an RRC connected state 901 according to the first communication protocol according to the LTE system.

According to various embodiments, in operation 903, while the first wireless communication module 192A performs communication connection with the MN 910, the second wireless communication module 192B may perform measurement for SN addition. The measurement for the SN addition may be measurement on a signal received from at least one base station belonging to the SN. Its measurement result may be temporarily stored in a memory (e.g., the memory 130 of FIG. 1).

According to various embodiments, in operation 905, the first wireless communication module 192A and the MN 910 may exchange authentication and security related messages. According to various embodiments, in operation 907, the MN 910 may forward an RRC connection reconfiguration message including measurement configuration information (SN Meas. Config) for the SN addition to the first wireless communication module 192A of the electronic device 101, and the first wireless communication module 192A may switch to an access complete state 913.

According to various embodiments, in operation 909, the first wireless communication module 192A may transmit measurement configuration information received through the connection reconfiguration message to the second wireless communication module 192B. According to an embodiment, the first wireless communication module 192A may forward the measurement configuration information to the processor 120, and the processor 120 may forward it to the second wireless communication module 192B.

According to various embodiments, in operation 911, the second wireless communication module 192B or the processor 120 may determine contents to report, based on the measurement configuration information received from the MN 910 and the measurement configuration information used for the measurement of the SN 920 as explained above. According to various embodiments, in operation 915, the electronic device 101 may transmit a measurement result to the MN 910 using the first wireless communication module 192A.

According to various embodiments, in operation 917, the MN 910 receiving the measurement result of the SN may determine a base station to be operated as the SN of the dual connectivity based on the received measurement result. In operation 919, the MN 910 may exchange request and response messages for the SN addition with the determined SN 920.

According to various embodiments, in operation 921, the first wireless communication module 192A may receive an RRC connection reconfiguration message including SN addition configuration information from the MN 910. The SN addition configuration information may include SN information to add. According to various embodiments, in operation 923, the first wireless communication module 192A may forward the SN addition configuration information received through the connection reconfiguration message to the second wireless communication module 192B. According to an embodiment, the first wireless communication module 192A may forward the SN addition configuration information to the processor 120, and the processor 120 may request the SN addition from the second wireless communication module 192B.

According to various embodiments, the second wireless communication module 192B may exchange a signaling signal for configuring communication connection with the SN 920 in response to the SN addition request, in operation 925, and enter an SN addition complete state, in operation 927.

If the SN addition is finished, the electronic device 101 may be operated in the dual connectivity environment, and transmit and receive data to and from the MN 910 and/or the SN 920 using the first wireless communication module 192A and/or the second wireless communication module 192B.

Figure 10:
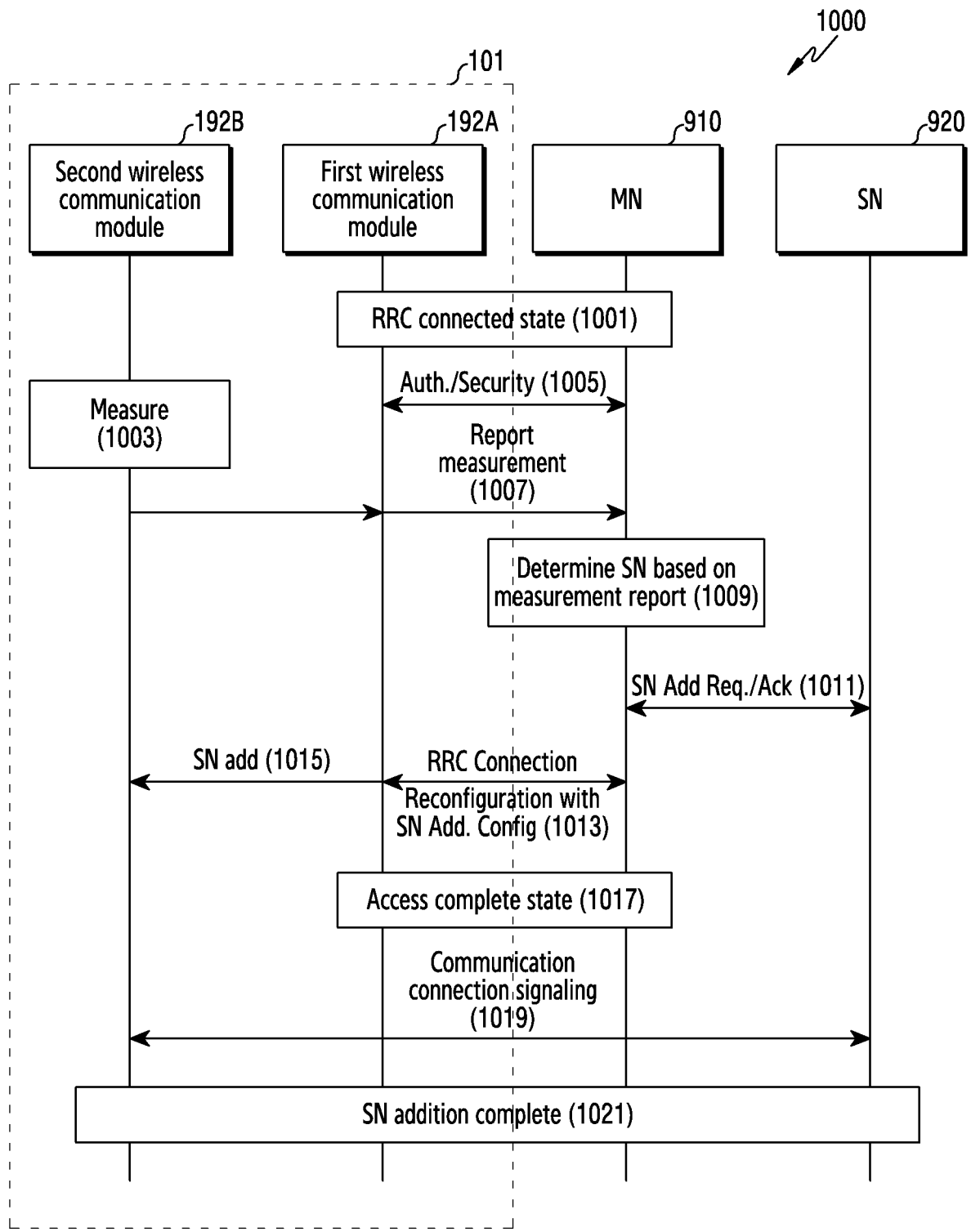
FIG. 10 is a flowchart of another embodiment illustrating operations of an electronic device for performing communication connection with an MN and an SN for dual connectivity according to various embodiments.

FIG. 10 is a flowchart 1000 of another embodiment illustrating operations of an electronic device 101 for performing communication connection with an MN and an SN for dual connectivity according to various embodiments. An operating entity of the flowchart 1000 shown in FIG. 10 may be understood as an electronic device (e.g., the electronic device 101 of FIG. 1) or a component (e.g., the processor 120 of FIG. 1, the first wireless communication module 192A and/or the second wireless communication module 192B of FIG. 4) of the electronic device 101.

Referring to FIG. 10, the first wireless communication module 192A of the electronic device 101 may switch from an RRC idle state (e.g., the RRC idle state 601 shown in FIG. 6) to an RRC connected state 1001 according to the first communication protocol according to the LTE system.

According to various embodiments, in operation 1003, while the first wireless communication module 192A performs communication connection with the MN 910, the second wireless communication module 192B may perform measurement for SN addition. The measurement for the SN addition may be measurement of a signal received from at least one base station belonging to the SN. According to an embodiment, the processor 120 may control to perform communication connection with the MN 910 through the first wireless communication module 192A, and control to perform the measurement for the SN addition through the second wireless communication module 192B. A measurement result may be temporarily stored in a memory (e.g., the memory 130 of FIG. 1).

According to various embodiments, in operation 1005, the first wireless communication module 192A and the MN 910 may exchange authentication and security related messages.

According to various embodiments, in operation 1007, the processor 120 or the second wireless communication module 192B may transmit the measurement result for the SN addition to the MN 910 using the first wireless communication module 192A. If the processor 120 of the electronic device 101 or the second wireless communication module 192B receives no measurement configuration information from the MN base station 910, there may be no reporting configuration information included in the measurement configuration information. According to an embodiment, the electronic device 101 may store default reporting configuration information in association with the MN base station 910, and if having no reporting configuration information of a specific MN base station, the electronic device 101 may transmit the measurement result to the MN 910 using the default reporting configuration. According to another embodiment, if receiving no measurement configuration information, the electronic device 101 may define an RRC signaling message to be used to transmit a measurement result arbitrarily measured by the electronic device 101 to the MN 910, and transmit the measurement result to the MN 910 using the RRC signaling message newly defined.

According to various embodiments, in operation 1009, the MN 910 receiving the measurement result of the SN may determine a base station to be operated as the SN of the dual connectivity based on the received measurement result. According to various embodiments, in operation 1011, the MN 910 may exchange request and response messages for the SN addition with the determined SN 920.

According to various embodiments, in operation 1013, the first wireless communication module 192A may receive an RRC connection reconfiguration message including SN addition configuration information from the MN 910. The SN addition configuration information may include information of the SN 920 to add. The MN 910 may forward the RRC connection reconfiguration information including the SN addition configuration information to the first wireless communication module 192A of the electronic device 101, and the first wireless communication module 192A may be switched to an access complete state 1017. According to various embodiments, in operation 1015, the first wireless communication module 192A may forward the SN addition configuration information received through the connection reconfiguration message to the second wireless communication module 192B. According to an embodiment, the first wireless communication module 192A may forward the SN addition configuration information to the processor 120, and the processor 120 may request the SN addition from the second wireless communication module 192B.

According to various embodiments, in operation 1019, the second wireless communication module 192B may exchange a signaling signal for configuring communication connection with the SN 920 in response to the SN addition request. In operation 1021, the second wireless communication module 192B and the SN 920 may enter an SN addition complete state.

If the SN addition is finished, the electronic device 101 may be operated in the dual connectivity environment, and may transmit and receive data to and from the MN 910 and/or the SN 920 using the first wireless communication module 192A and/or the second wireless communication module 192B.

According to the operations shown in FIG. 10, the electronic device 101 may receive the SN addition configuration information through the first RRC connection reconfiguration message (e.g., 1013 of FIG. 10) during the communication connection operations between the electronic device 101 and the MN 910, and thus a delay time required to add the SN 920 may be reduced.

Figure 11:
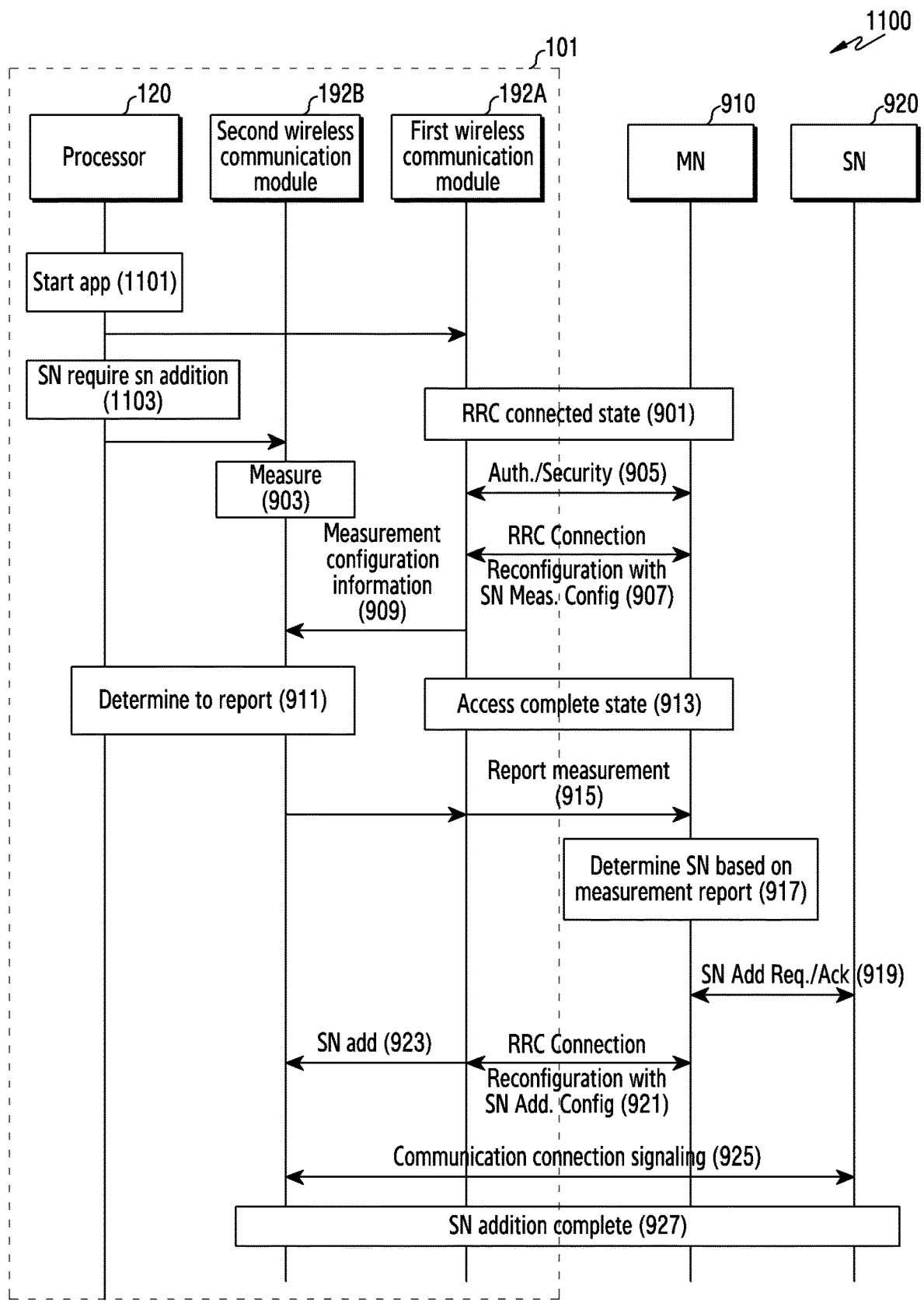
FIG. 11 is a flowchart according to yet another embodiment illustrating operations of an electronic device for performing communication connection with an MN and an SN for dual connectivity according to various embodiments.

FIG. 11 is a flowchart 1100 of yet another embodiment illustrating operations of an electronic device 101 for performing communication connection with an MN and an SN for dual connectivity according to various embodiments. An operating entity of the flowchart 1100 shown in FIG. 11 may be understood as an electronic device (e.g., the electronic device 101 of FIG. 1) or a component (e.g., the processor 120 of FIG. 1, the first wireless communication module 192A and/or the second wireless communication module 192B of FIG. 4) of the electronic device 101.

FIG. 11 is the embodiment showing operations of performing measurement by examining SN addition necessity in advance by the processor 120 in addition to the embodiment shown in FIG. 9.

Referring to FIG. 11, in operation 1101, if an app operated at the electronic device 101 is started or data transmission is requested, the processor 120 of the electronic device 101 may request the first wireless communication module 192A to initiate communication connection for the MN 910. The first wireless communication module 192A receiving this request may switch from an RRC idle state (e.g., the RRC idle state 601 shown in FIG. 6) to an RRC connected state (e.g., the RRC connected state 901 shown in FIG. 9) according to the first communication protocol according to the LTE system, and perform operations for completing the communication connection with the MN 910 shown in FIG. 6 or FIG. 9.

In operation 1103, the processor 120 of the electronic device 101 may determine whether SN addition is necessary. According to various embodiments, the electronic device 101 may wait for transmission during the communication connection with the MN 910, and determine whether the communication connection with the SN is necessary, by referring to an amount of packets accumulated in an internal storage device (e.g., the memory 130). According to another embodiment, the electronic device 101 may determine whether the communication connection with the SN is necessary to satisfy a QoS requested by a QoS flow by using configuration information of the QoS flow requested by the application. According to yet another embodiment, the electronic device 101 may determine whether the communication connection with the SN is necessary based on attribute information of an application which causes the communication connection with the MN 910 in operation 1101. For example, if an executed application is an SNS, transmission and reception of short messages dominates and thus it may be determined that the communication connection with the second base station is not necessary. As another embodiment, if the application executed is an FTP service or a video playback program, it is highly likely that a great amount of packets is continuously transmitted or received and thus it may be determined that the communication connection with the SN is required.

According to various embodiments, if determining that the SN addition is necessary, the processor 120 of the electronic device 101 may request measurement for the SN addition from the second wireless communication module 192B, and the second wireless communication module 192B may perform the measurement for the SN addition in operation 903 in response to the measurement request. Other subsequent operations may be the same as in the descriptions of FIG. 9. By contrast, if the processor 120 of the electronic device 101 determines that SN addition is not necessary, it may not request the measurement for the SN addition from the second wireless communication module 192B. The second wireless communication module 192B is in an off state, only the first wireless communication module 192A is turned on, and thus the electronic device 101 may perform the communication connection only with the MN 910 according to the operations shown in FIG. 6. If the access to the SN is not necessary according to such determination, the electronic device 101 may turn the second wireless communication module 192B off and thus reduce the power consumption which may be generated by the second wireless communication module 192B.

According to various embodiments, an operating method of an electronic device (e.g., the electronic device 101) may include, using a first communication circuit (e.g., the first wireless communication module 192A of FIG. 5), performing communication connection with an MN base station (e.g., the MN 310 of FIG. 3A) operating as an MN, together with performing the communication connection with the MN base station, measuring a state of a signal received from at least one base station for operating as an SN using the at least one first measurement configuration information, using a second communication circuit (e.g., the second wireless communication module 192B of FIG. 5), and transmitting a first message including at least part of the measurement result, to the MN base station.

According to various embodiments, it may further include receiving from the MN base station (e.g., the MN 310 of FIG. 3A), a second message including at least one second measurement configuration information for performing signal state measurement using the second communication circuit (e.g., the second wireless communication module 192B of FIG. 5), wherein transmitting the first message including at least part of the measurement result may include transmitting the first message including at least part of the measurement result, to the MN base station, based on the at least one second measurement configuration information.

According to various embodiments, measuring the state of the signal from at least one second base station using the at least one first measurement configuration information may include determining validity with respect to the at least one first measurement configuration information and measuring the state of the signal from the at least one base station for operating as the SN using first measurement configuration information determined to be valid.

According to various embodiments, the at least one first measurement configuration information may include at least one third measurement configuration information received from a third base station accessed as an MN in past.

According to various embodiments, it may further include receiving a third message including information of a second base station for operating as an SN selected based on the second message, from the first base station, and performing communication connection with the selected second base station.

According to various embodiments, determining whether the communication connection with the SN is required may include at least one operation of determining whether the communication connection with the SN is required based on an amount of packets accumulated at the electronic device (e.g., the electronic device 101) during transmission standby, while performing the communication connection with the SN, determining whether the communication connection with the SN is required based on a QoS requested by an application or determining whether the communication connection with the SN is required based on attribute information of the application.

According to various embodiments, determining validity of each of the at least one first measurement configuration information may include setting a valid time for each of the at least one first measurement configuration information and determining that first measurement configuration information of which the valid time does not expire is valid.

According to various embodiments, the valid time may be set differently depending on mobility of the electronic device (e.g., the electronic device 101).

According to various embodiments, determining validity of each of the at least one first measurement configuration information may include associating and storing the at least one first measurement configuration information with a first base station and determining that first measurement configuration information associated with the first base station which performs the communication connection is valid.

According to various embodiments, associating and storing the at least one first measurement configuration information with the first base station may further include storing first measurement configuration information including third measurement configuration information in association with a third base station which transmits the third measurement configuration information in past with respect to the third measurement configuration information received from the third base station in past.

According to various embodiments, the at least one first measurement configuration information may include fourth measurement configuration information obtained based on a fourth base station accessed by the electronic device (e.g., the electronic device 101) as an SN to build a dual connectivity environment, and associating and storing the at least one first measurement configuration information with the first base station may store the first measurement configuration information including the fourth measurement configuration information in association with a fifth base station which builds the dual connectivity environment as the MN together with the fourth base station.

According to various embodiments, measuring the state of the signal from the at least one second base station using the at least one first measurement configuration information may further include recognizing that a network supports a dual connectivity environment and determining a measurement start timing for measuring the state of the signal from the at least one second base station using the at least one first measurement configuration information, based on the recognition timing.

According to various embodiments, measuring the state of the signal from the at least one second base station using the at least one first measurement configuration information may further include calculating a time required to measure the state of the signal from the at least one second base station using the at least one first measurement configuration information, and may include determining a measurement start timing for measuring the state of the signal from the at least one second base station using the at least one first measurement configuration information, further based on the calculated time.

According to various embodiments, an operating method of an electronic device (e.g., the electronic device 101) may include, using a first communication circuit (e.g., the first wireless communication module 192A of FIG. 5), performing communication connection with a first base station 910 corresponding to an MN, together with performing the communication connection with the first base station 910, measuring a state of a signal received from at least one second base station using the at least one first measurement configuration information, using a second communication circuit (e.g., the second wireless communication module 192B of FIG. 5), and transmitting a second message including at least part of the measurement result, to the first base station 910.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device of a network comprising:
a first communication circuit configured to provide first wireless communication using a first frequency range;
a second communication circuit configured to provide second wireless communication using a second frequency range;
a processor operatively connected with the first communication circuit and the second communication circuit; and
a memory operatively connected with the processor, and configured to store at least one first measurement configuration information,
wherein the memory stores instructions for, when executed, causing the processor to,
using the first communication circuit, perform communication connection with a master node (MN) base station operating as an MN,
while performing the communication connection with the MN base station, measure a state of a signal from at least one base station for operating as a secondary node (SN) using the at least one first measurement configuration information, using the second communication circuit,
transmit a first message comprising at least part of the measurement result, to the MN base station;
receive a second message from the MN base station, a second message comprising at least one second measurement configuration information for performing signal state measurement using the second communication circuit;
transmit the first message comprising at least part of the measurement result, to the MN base station, based on the at least one second measurement configuration information; and
determine a start timing for measuring the state of the signal from at least one base station for operating as the secondary node by using the at least one first measurement configuration information based on a timing of recognizing that the network supports a dual connectivity environment based on information received from the MN base station.

2. The electronic device of claim 1, wherein the instructions cause the processor to,
based on the at least one second measurement configuration information, update and store the at least one first configuration information in the memory.

3. The electronic device of claim 1, wherein the instructions cause the processor to,
receive from the MN base station, a third message comprising information an SN base station for operating as a secondary node selected based on the first message, and
perform communication connection with the SN base station.

4. The electronic device of claim 3, wherein the instructions cause the processor to,
store measurement configuration information obtained based on system information of the communication-connected SN base station in the memory to be included in the at least one first measurement configuration information.

5. The electronic device of claim 1, wherein the instructions cause the processor to,
determine validity with respect to the at least one first measurement configuration information, and
based on the determination result, measure a state of a signal from at least one base station for operating as the secondary node using the first measurement configuration information determined to be valid.

6. The electronic device of claim 5, wherein the instructions cause the processor to,
during the communication connection with the MN base station, determine whether communication connection with the base station for operating as the secondary node is necessary based on an amount of packets accumulated at the electronic device while waiting for transmission, a quality of service (QoS) requested by an application executed in the electronic device, or attribute information of the application, and
as a result of the determination, measure the state of the signal from at least one base station for operating as the secondary node only if determining that the communication connection with the base station for operating as the secondary node is necessary.

7. The electronic device of claim 5, wherein the instructions cause the processor to,
set a valid time with respect to the at least one first measurement configuration information, and
determine that the first measurement configuration information is valid, based on the valid time.

8. The electronic device of claim 7, wherein the valid time is set differently according to mobility of the electronic device.

9. The electronic device of claim 5, wherein the instructions cause the processor to,
store the at least one first measurement configuration information in association with at least one MN base station, and
determine that first measurement configuration information associated with the MN base station which performs the communication connection is valid among the at least one first measurement configuration information.

10. The electronic device of claim 1, wherein the instructions cause the processor to,
calculate a time required to measure the state of the signal from at least one base station for operating as the SN using the at least one first measurement configuration information, and
based on the calculation result, determine the measurement start timing for measuring the state of the signal from at least one base station for operating as the SN using the at least one first measurement configuration information.

11. An operating method of an electronic device of a network comprising:
using a first communication circuit, performing communication connection with a master node (MN) base station operating as an MN;
together with performing the communication connection with the MN base station, measuring a state of a signal received from at least one base station for operating as a secondary node (SN) using the at least one first measurement configuration information, using a second communication circuit;
transmitting a first message comprising at least part of the measurement result, to the MN base station; and
receiving from the MN base station, a second message comprising at least one second measurement configuration information for performing signal state measurement using the second communication circuit,
wherein transmitting the first message comprising at least part of the measurement result comprises transmitting the first message comprising at least part of the measurement result, to the MN base station, based on the at least one second measurement configuration information, and
wherein the measuring the state of the signal received from at least one base station for operating as the secondary node (SN) comprises determining a start timing for measuring the state of the signal from at least one base station for operating as the secondary node by using the at least one first measurement configuration information based on a timing of recognizing that a network supports a dual connectivity environment based on information received from the MN base station.

12. The method of claim 11, wherein measuring the state of the signal from at least one second base station using the at least one first measurement configuration information comprises:
determining validity with respect to the at least one first measurement configuration information; and
measuring the state of the signal from the at least one base station for operating as the SN using first measurement configuration information determined to be valid.

* * * * *